United States Patent [19]

Rawlings et al.

[11] 4,144,650
[45] Mar. 20, 1979

[54] MULTI-FUNCTION LEVEL

[75] Inventors: Eugene Rawlings, 100 Glenolden Ave., Glenolden, Pa. 19036; Stephen Guerrera, Pottstown, Pa.

[73] Assignee: Eugene Rawlings, Glenolden, Pa.

[21] Appl. No.: 908,705

[22] Filed: May 23, 1978

[51] Int. Cl.² .............................................. B43L 7/06
[52] U.S. Cl. ........................................... 33/88; 33/119
[58] Field of Search .................... 33/88, 89, 117, 119, 33/120

[56] References Cited

U.S. PATENT DOCUMENTS

| | | | |
|---|---|---|---|
| 1,440,284 | 12/1922 | Engstrom | 33/117 X |
| 2,661,034 | 12/1953 | MacDonald | 33/119 X |
| 3,783,518 | 1/1974 | Jones | 33/89 X |

Primary Examiner—Charles E. Phillips
Attorney, Agent, or Firm—Frederick J. Olsson

[57] ABSTRACT

A pair of arms pivotally connected for relative rotation and a brake actuated by a rotatable lever positionable from either side of the level to restrain the arms against relative rotation or to allow the arms to freely rotate.

7 Claims, 9 Drawing Figures

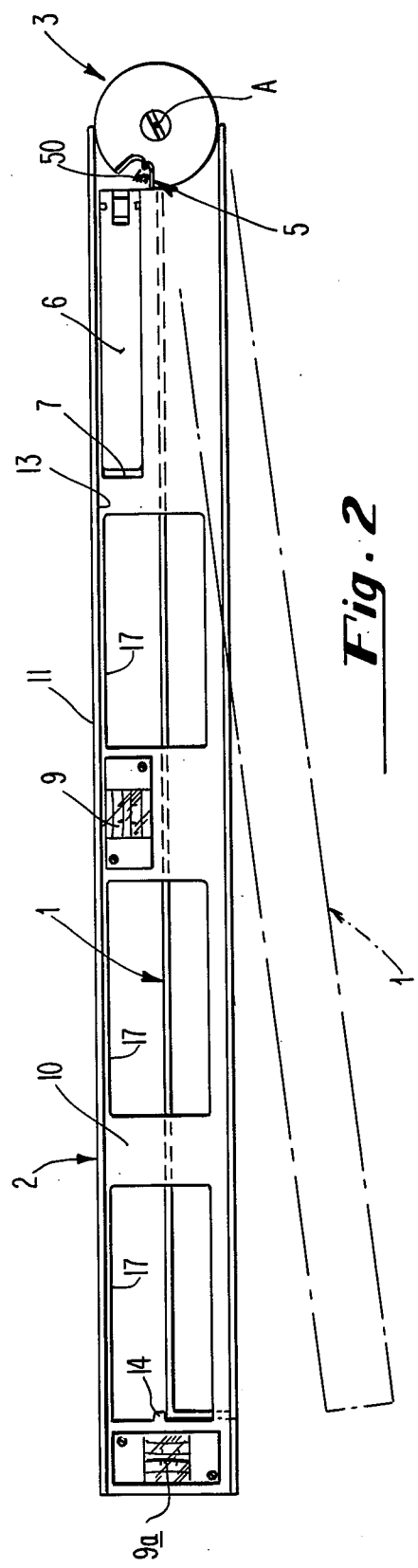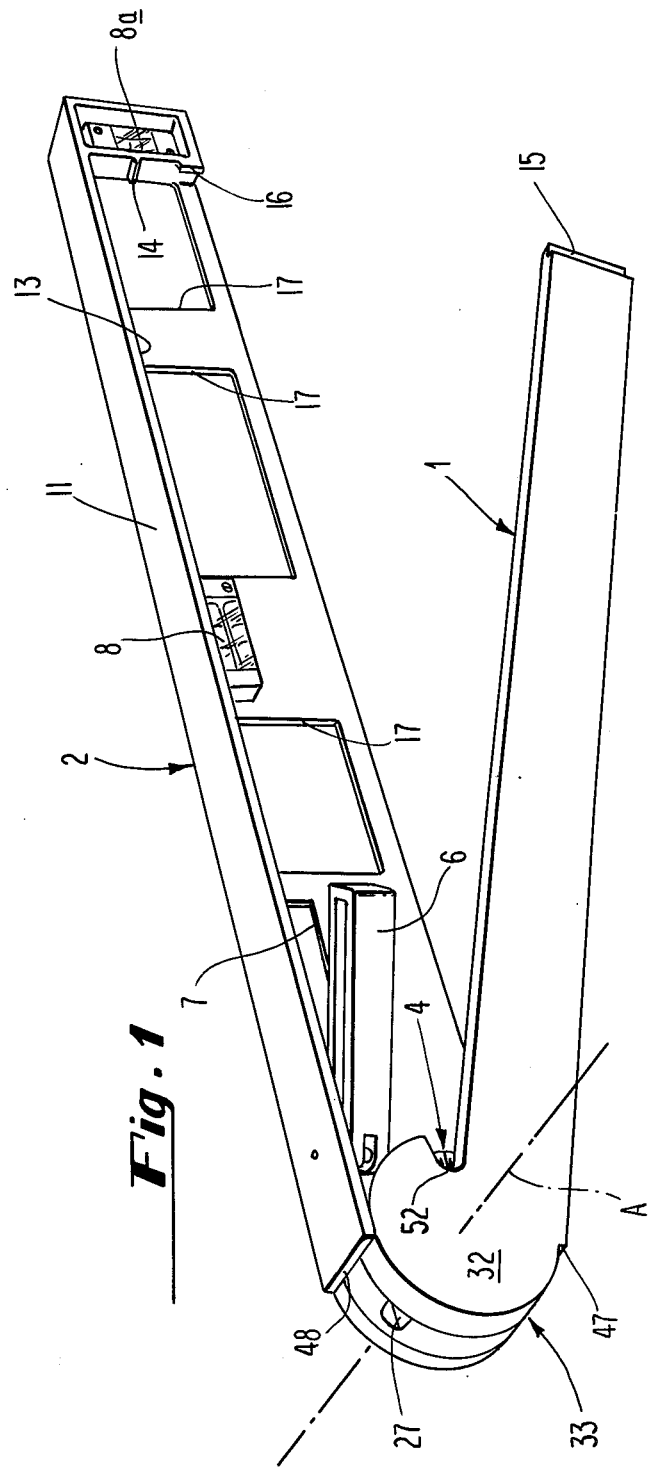

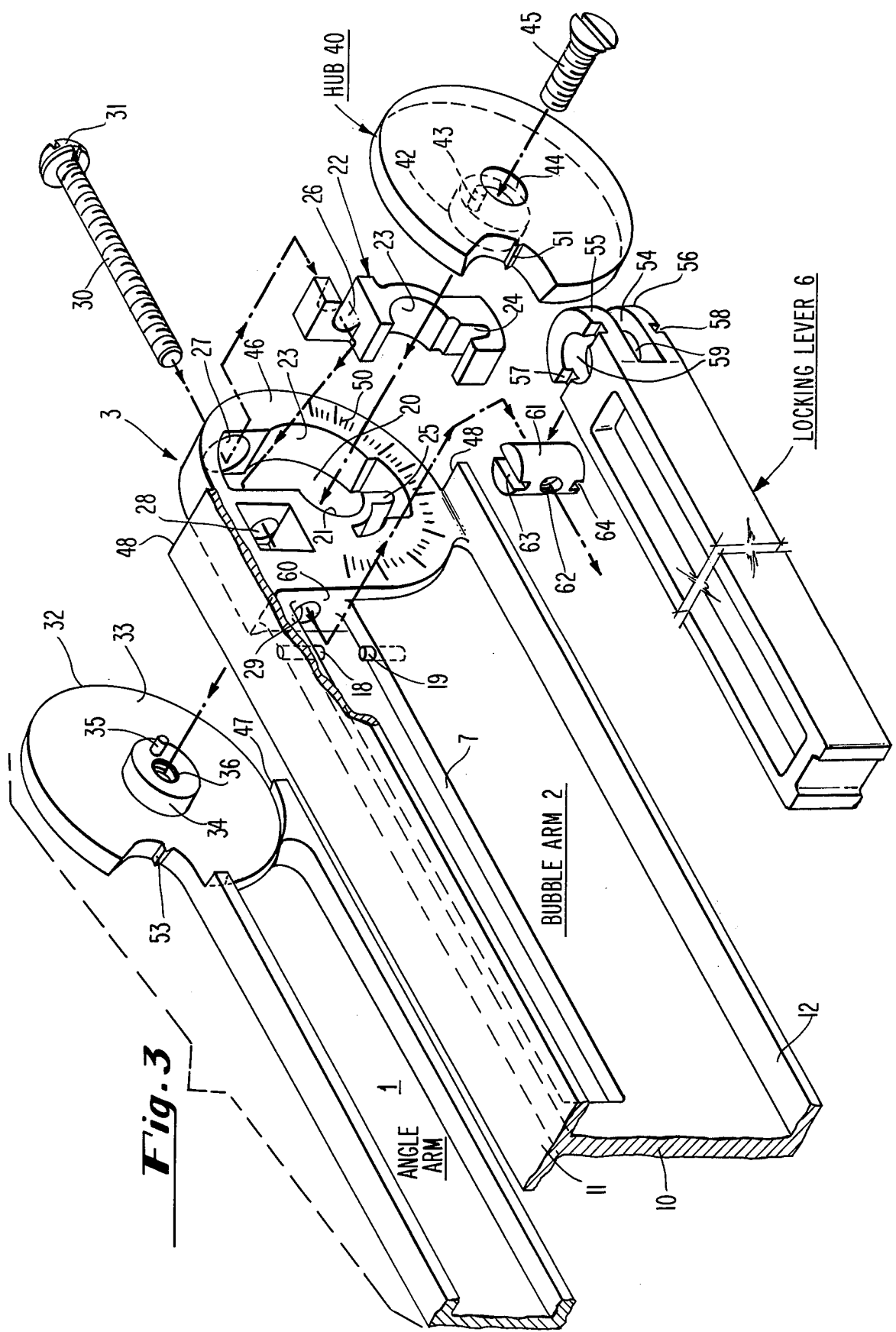

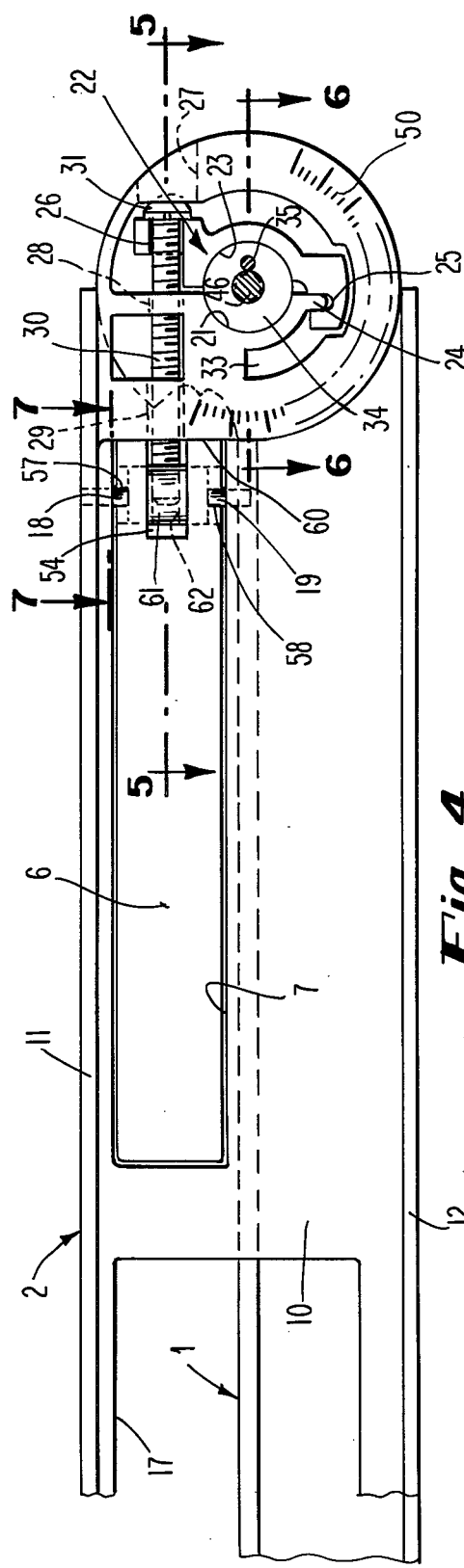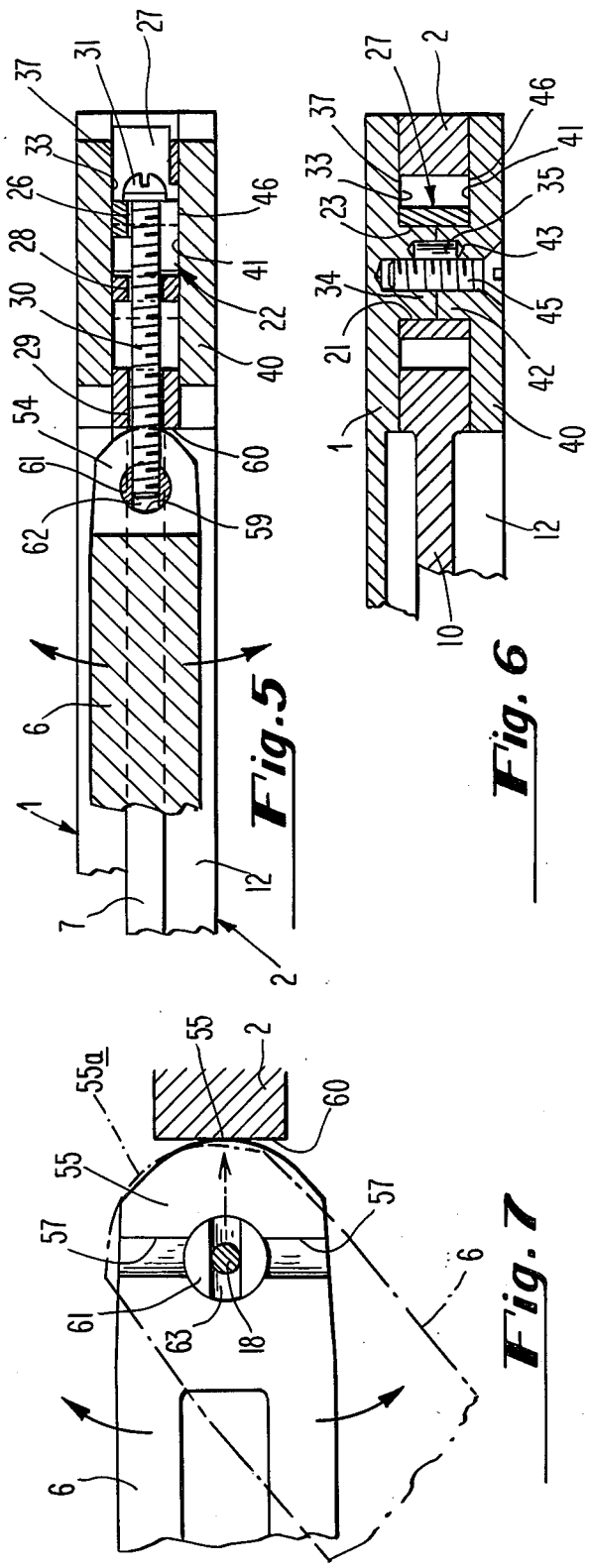

MULTI-FUNCTION LEVEL

This invention relates to levels for use by machanics such as roofers, siding applicators, masons, carpenters, steam fitters and the like.

More specifically, the invention relates to a multi-function level which has a pair of pivotally connected operating arms movable as between a closed, nested position to any of a plurality of open position, the device being useable as a spirit level for determining horizontal or vertical positions, as a square, and an angle finder.

Typical levels of the kind in question are shown in U.S. Pat. Nos. 104,577; 946,472; 978,525; 1,219,095; 2,878,569; and 3,522,567.

The primary object of the invention is to provide an improved structure for such a multifunction level which at long last makes the employment of such levels by mechanics truly practical.

The structural feature which contributes to making the level truly a practical device is the combination of mechanism for rotatably mounting the operating arms and a brake for locking and unlocking the operating arms in the closed or in the angle finding positions and which can be operated equally well from either side of the level.

The above and other important structural features will be apparent from the description below taken in conjunction with the following drawings wherein:

FIG. 1 is a perspective view of the level of the invention with the operating arms in a open position;

FIG. 2 is a perspective view of the level taken from the side opposite to the side of FIG. 1 and showing the operating arms (full lines) in closed position;

FIG. 3 is an exploded view particularly illustrating the arm-mounting and the brake mechanism of the level;

FIG. 4 is an elevational view of the parts of FIG. 3 in assembled condition but with a hub member omited;

FIG. 5 is a view taken along the lines 5—5 in FIG. 4;

FIG. 6 is a view taken along the lines 6—6 in FIG. 4;

FIG. 7 is an enlarged view illustrating the function of the brake mechanism;

Figure 8:
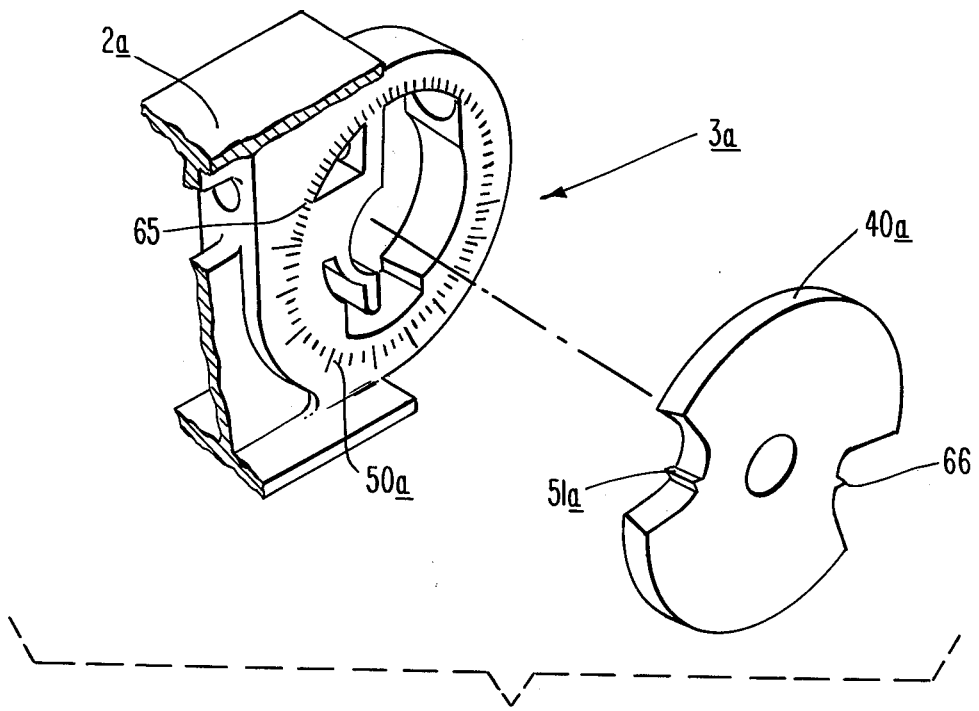
FIG. 8 is an exploded fragmentary view illustrating an alternative scale/pointer arrangement.

In FIGS. 1 and 2 the level operating arms comprise the angle arm 1 and the bubble arm 2 which are connected at the end 3 for rotation about the axis A as between (FIG. 2) a closed position as shown by the full lines and any open position as shown by the dotted lines (see also FIG. 1). The angular displacement of the arm is indicated by scale/pointer arrangements on opposite sides of the level as noted at 4 and 5.

A brake mechanism at the end 3 is operated by a locking lever 6 rotatably mounted in the opening 7 of the bubble arm for movement as between an inboard position and outboard positions on either side of the level. In the inboard position, the lever is disposed within the opening 7 and causes the brake mechanism to restrain the arms against motion. When the lever is rotated to an outboard position, for example, as shown in FIG. 1, the brake is released and the arms are free to rotate.

The bubble arm carries the bubble vials 8 and 8a on one side (FIG. 1) and corresponding vials 9 and 9a on the opposite side (see FIG. 2).

The vials, scales and the outboard lever positioning provides for the level to be employed from either side.

The bubble arm 2 has an I-type cross sectional shape with web 10 and upper flange 11 and lower flange 12. The lower flange 12 is partially cut away to form a socket 13 for nesting the angle arm in closed position. The closed position is determined by the abutment 14 which is engaged by the angle arm 1. The angle arm 1 is formed with a keeper 15 and the bubble arm 2 has a keeper 16. These keepers are aligned in closed position to prevent the arms 1 and 2 from spreading apart in a direction perpendicular to the axis of rotation.

The web 10 has cut-outs 17 and also it will be noted (FIG. 3) that the angle arm 1 has a generally C-shaped cross section. The foregoing is for weight saving purposes. The pins 18 and 19 fixed to the bubble arm extend into the opening 7. The purpose of these pins will be explained later.

In the closed position, the level has a generally rectangular shape so that either side, the top or bottom can be placed against the surface being investigated and employed as a conventional spirit level. This is accomplished by that in the closed position: the side surface of the angle arm 1 is flush with the edge of the top flange 11; the bottom surface of the angle arm is flush with the outer surface of the flange 12; the outer edges of the flanges 11 and 12 are flush; and the outer surfaces of the flanges 11 and 12 are parallel one another.

Parenthetically, it is to be noted that the flanges 11 and 12 are provided with scales (not shown) for linear measurements.

The mechanism for rotatably mounting the arms 1 and 2 and the brake mechanism is integrated and the manner in which this is done will next be explained.

First, refering to FIG. 3, the end 3 of the bubble arm has a contoured insert section 20 which includes the concave, semi-circular surface 21. A brake insert 22, which generally follows a contour of the insert section 20 is formed with a concave semi-circular surface 23. The brake insert 22 is adapted to fit into the section 20 with a relatively loose fit and in such condition the concave surfaces 21 and 23 face each other and form a circular opening.

The bottom of the brake insert 22 is formed with a groove 24 and the insert section 20 includes the tongue 25, which is retained in the groove 24 as shown in FIG. 4 with a snug, sliding fit. The top of the insert 22 has a cut out section 26.

The bubble arm has a cut-out section 27 and apertures 28 and 29 which are aligned with the cut-out section 27. When the insert 22 is in the section 20, the cut-outs 26 and 27 and apertures 28 and 29 are generally co-axial as shown in FIG. 4.

A screw 30 is adapted to extend into the bubble arm thru the cut-out 27, the cut-out 26 and apertures 28 and 29. The head 31 of the screw bears on the top of the insert 22. As will be apparent, the head 31 of the screw is accessible through the cut-out 27 for turning.

The angle arm 1 includes a circular end section 32 having surface 33 and shaft section 34 mounting the pin 35 and having a threaded hole 36. The surface 33 is adapted to abut the surface 37 on the bubble arm as indicated in FIGS. 5 and 6.

On the opposite side of the bubble arm is a hub 40 having a surface 41, a shaft section 42 (the same diameter as shaft section 34) aperture 43 and an opening 44 to receive the screw 45.

The surface 41 of the hub is adapted to abut the surface 46 on the bubble arm as indicated in FIGS. 5 and 6. When the hub is in this position the pin 35 is received by the aperture 43. Then the screw 45 is threaded into the hole 36 and tightened up, the ends of the shaft sections 34 and 42 abut one another. This positions the facing surfaces 33-37 and 41-46 so that the same engage in a snug, sliding fit condition.

It will be evident that the opening formed by the concave surfaces 21 and 23 mounts the shaft sections 35 and 42. The pin 35 and screw 45 connect the shaft sections 34 and 42 together so that they effectively form a single shaft and also connect the angle arm and hub together so that they rotate in unison. The bubble arm is captured between the hub 40 and end section 32 and has a sliding fit with respect to the shaft 34/42.

The axis of the shaft 34/42 is the axis A refered to above. The angle arm and the bubble arm are relatively rotatably about this axis as between the closed position and any open position. In the particular design shown, the maximum open position is with the arms extending in-line or at 180°. This latter position is determined by the engagement of the abutment 47 on the angle arm and the abutment 48 on the bubble arm.

The 180° open position practically doubles the length of the level. This enhances the utility of the level in making horizontal and vertical determinations.

The scale/pointer 5 arrangement includes the scale 50 on bubble arm 2 and pointer 51 on hub 40. Except for the pointer 51 and the immediate surrounding area the scale 50 is covered by the hub 40. The scale/pointer 4 includes the scale 52 (FIG. 1) on the bubble arm and pointer 53 (FIG. 3) on the end section 32 of the angle arm. The scale 52 is covered by section 32 except for the pointer 53 and the immediate surrounding area.

The scales are set up so that when the operating arm is in the closed position the respective pointers are on zero degrees and as the arms are opened the pointers indicate angle including the maximum open angle of 180°.

When the arms are at 90°, the level can be used as a square. Scales (not shown) are incorporated along the angle and bubble arms for use in making lineal measurements in the square condition.

The structure and operation of the braking mechanism are treated below.

The brake-on action is provided by the brake insert 22 being moved toward the shaft axis so that the concave surfaces 21 and 23 grip the shaft and develop forces to restrain motion and brake-off action is provided by movement of the insert 22 away from the shaft axis to relieve the restraining forces. The manner in which the brake insert 22 is actuated to perform the foregoing is next explained.

The right hand end of the lever 6 has a slot 54 which forms the upper and lower flanges 55 and 56. The upper flange 55 has a pin slot 57 and lower flange 56 has a pin slot 58. A pivot aperture 59 extends through the flanges. The outer edges of the flanges 55 and 56 each has a contoured surface indicated at 55a and 56a. These surfaces are eccentric with respect to the axis of the pivot aperture 59 and are adapted to engage the cam surface 60 on the bubble arm as noted later.

A pivot pin 61 has a threaded hole 62, upper pin slot 63 and lower pin slot 64. The pivot pin 61 is adapted to be disposed in the pivot aperture 59 with a snug, sliding fit.

The parts as shown in FIG. 3 are assembled as follows:

The pivot 61 is inserted into the pivot aperture 59 in the locking lever with the pin slot 63 turned 90° to the position shown. The lever is then inserted into the opening 7 with the pins 18 and 19 sliding into the slots 57/63 and 58/64 until the lever is centered in the opening 7 or in the inboard position as indicated in FIG. 5.

The pivot pin 61 is then rotated 90° so that the threaded hole 62 is in-line with the aperture 29 in the bubble arm.

The brake insert 22 is now placed in the section 20 and the screw 30 is inserted into the bubble arm through cut-out 27, cut-out 26 and aperture 28 and 29 and slightly threaded into the hole 62 in the pivot 61. The pivot pin now rotatably mounts the lever 6. The pins 18 and 19 and the screw 30 retain the pivot pin in the opening 7.

The angle arm 1 is placed into the socket 13 so that the shaft section 34 fits into the opening formed by the surfaces 21 and 23. Next, the hub 40 is placed into position with the opening 43 receiving the pin 35 and the shaft section 42 extending into the opening formed by surfaces 21 and 23. The screw 45 is then inserted through opening 44 tightened up in the threaded hole 36.

At this point, with the lever 6 in the inboard position the screw 30 is tightened up. As the screw threads into the pivot pin 61, the head 31 of the screw engages the top of the brake insert 22. The pivot pin 61 is tight in the aperture 59 and the lever 6 is moved to the right (as viewed in FIG. 4) so that the eccentric surfaces 55a and 56a engage the cam surface 60 (FIG. 7). The pivot pin slots 63 and 64 allow the lever 6 to slide relative to pins 18 and 19. The screw head 31 tends to rotate the insert 22 counterclockwise (as viewed in FIG. 4). The counterclockwise motion is resisted by the tongue 24 bearing on the groove 25. The structure forming the groove 24 and the tongue 25 will have a tendency to yield with increasing pressure. The surface 23 of the brake insert bears on the shaft 34/42 which in turn bears on the surface 21 on the bubble arm. Further tightening of the screw 30 generates forces which grip the shaft and restrain relative angular motion as between the angle and bubble arms.

This restraining force can be relieved by moving the lever 6 to an outboard position. This causes the eccentric surfaces 55a and 56a to disengage from the cam surface 60 as noted by the dotted lines in FIG. 7. This relieves the pressure on the top of the insert 22 so that the insert is free to rotate clockwise or away from the shaft, this motion being assisted by the yielding connection of the tongue 24 in the slot 25. The angle and bubble arms are now free to rotate It will be understood, of course, that the motion of the insert 22 is relatively small or in the order of a few thousands of an inch.

The magnitude of the braking force is controlled by the amount by which screw 30 is tightened. Also, the tightening of the screw can be used to compensate for wear, if any.

The scales 50 and 52 may comprise markings placed on the bubble arm or may comprise a separate piece adhesively secured to the bubble arm. In either case it will be understood that when the angle arm is in the closed position, the pointers 51 and 53 point to the zero indication on the scales. The pin 35 on the angle arm and opening 43 in the hub are located with respect to the pointers to that upon assembly as above described the pointers will indicate the zero angles.

An alternative scale arrangement by which the acute and complementary angles are simultaneously indicated is illustrated in FIG. 8. This is especially useful for steamfitters.

The end 3a of the bubble arm 2a has a scale 50a (same as scale 50) and a second scale 65. The scale 65 has its 180° indication at the zero point of scale 50a and its zero indication at the 180° indication at scale 50a.

The hub 40a has a pointer 51a (same as pointer 51) and a second pointer 66 diametrically opposed. The pointer 66 is for use with the scale 65. The pair of scales 51a and 65 respectively cooperate with the pair of pointers 51a and 66. Another set of scales is provided on the opposite side of the bubble arm.

It will be seen that when the pointer 51a indicates an acute angle of say 45°, the pointer 66 indicates the complement or 135°.

It will be understood that the braking system and the locking lever greatly enhances the facility and accuracy of mechanics in angle finding operations. For such purposes, the locking lever is put to an outboard position and the angle arm is placed against the surface to be measured while the bubble arm is rotated until the bubble indicates correct orientation. At that time, the lever 6 is simply pushed into the inboard position which locks the bubble and angle arms. The level can then be picked up and the angle read by the mechanic or the level may be taken to some other point and used as a measuring instrument for scribing an angle.

Figure 9:
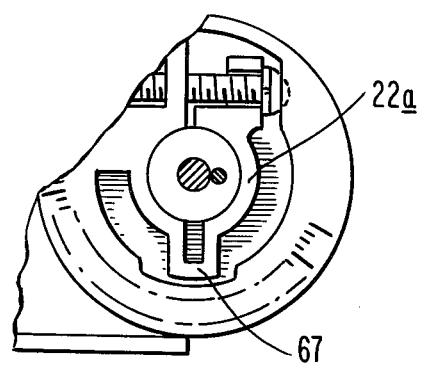
FIG. 9 is a fragmentary view illustrating an alternative arrangement for the brake mechanism.

Before closing, we refer to FIG. 9 which illustrates an alternative arrangement to provide a yielding arrangement for the brake insert. The brake insert 22a is directly connected to bubble arm as noted at 67 and thus is integral with the bubble arm. Otherwise the insert 22a is structured the same as insert 22.

We claim:

1. A multi-function level:
   a elongated bubble arm carrying a plurality of bubble-vial means;
   means forming a first semi-circular concave surface on one end of said bubble arm;
   an insert having a second semi-circular concave surface facing said first surface and also having a yielding connection with said bubble arm which provides for the second surface to move toward and away from the first surface, the two surfaces forming a generally circular shaped opening;
   an elongated angle arm disposed on one side of said bubble arm and one end of the angle arm being in sliding engagement with one end of the bubble arm;
   a hub disposed on the opposite side of said bubble arm at said one end thereof and in sliding engagement therewith;
   shaft means extending thru said opening, said surfaces rotatably mounting the shaft means;
   means connecting said shaft with said angle arm and with said hub to provide for said arms to relatively rotate about the shaft axis as between a closed position wherein the arms extend generally parallel one another to any of a plurality of open positions;
   an elongated opening extending through said bubble arm;
   an elongated locking lever, including an eccentric surface on one end thereof and a pivot aperture disposed inwardly of the eccentric surface and extending thru the lever;
   a pivot pin extending thru said aperture and rotatably mounting the lever in said opening for rotation to at least tow outboard positions and to an inboard position intermediate the outboard positions, one outboard position being on one side of the arms and the other outboard position being on the opposite side of the arms and said lever being in said intermediate position when disposed in said opening and extending generally parallel said arms;
   screw means rotatably mounted on said one end of the bubble arm and extending into the arm and threaded into said pivot pin, the head of the screw bearing on said insert; and
   a cam surface on said bubble arm to be engaged by said eccentric surface, movement of said lever to inboard position causing the pivot pin, screw and insert to move whereby said concave surfaces grip said shaft to generate forces opposing relative rotational motion of the angle and bubble arms and movement of said lever to either outboard position permitting said yielding connection to move said insert, screw and pivot pin whereby said concave surfaces ungrip the shaft to relieve said forces, said movement of the locking lever to said inboard position being for use in holding the arms in said closed position or in any of said open positions.

2. A level in accordance with claim 1, wherein said bubble arm has means forming an opening providing access to the head of said screw means for turning the same to effect movement of said concave surfaces toward or away from one another and thereby provide means to control the magnitude of said forces.

3. The level of claim 1 further including;
   a pair of angle scales respectively on opposite sides of said bubble arms and surrounding said shaft;
   a pair of pointers respectively formed on said hub and on said angle arm and adapted to respectively rotate over said scales upon relative rotation of said arms to indicate the angular distance between the arms in any of said open positions.

4. The level in accordance with claim 1 wherein said bubble arm has a socket extending along its length and containing said angle arm.

5. The level of claim 4 further including keeper means respectively on said bubble and angle arms and aligned when the arms are in the closed position to provide a barrier against movement of the angle arm outwardly of the socket in a direction perpendicular to the plane of rotation of the arms.

6. In a multifunction level;
   an elongated bubble arm carrying a plurality of bubble-vial means;
   an elongated angle arm, one end of the angle arm being in sliding engagement with one end of the bubble arm;
   shaft means;
   means rotatably mounting the bubble arm on the shaft means and fixedly connecting said shaft means with said angle arm to provide for the arms to relatively rotate about the shaft axis as between a closed position wherein the arms extend generally parallel one another to any of a plurality of open positions;
   brake means on said bubble arm and surrounding said shaft to grip the shaft to generate forces opposing relative rotation of the angle and bubble arms; and brake actuator means on said bubble arm including an operating lever rotatably mounted on the arm and movable to at least two outboard positions, one on one side of the arms and the other on the opposite side of the arms and to an inboard position intermediate the outboard positions, movement to the inboard position causing said brake means to grip said shaft to generate forces opposing relative rotational motion of said arms and movement to either one of the outboard positions causing said brake means to relieve said forces, said movement of the locking lever to said inboard position being for use in holding the arms in said closed position or in any of said open positions.

7. In a multifunction level:

an elongated bubble arm carrying a plurality of bubble-vial means;

an elongated angle arm, one end of the angle arm being in sliding engagement with one end of the bubble arm;

shaft means;

means connecting said shaft means with said angle arm and with said bubble arm and providing for the arms to be relatively rotatable about the shaft axis as between a closed position and any of a plurality of open positions, said connecting means fixedly connecting the shaft means to one of said arms and slidingly connecting the shaft means to the other of said arms;

brake means surrounding said shaft to grip the shaft to generate forces opposing relative rotation of the angle and bubble arms; and brake actuator means mounted on one of said arms and including an operating lever movable to at least two outboard positions, one on one side of the arms and the other on the opposite side of the arms and to an inboard position intermediate the outboard positions, movement to the inboard position causing said brake means to grip said shaft to generate forces opposing relative rotational motion of said arms and movement to either one of the outboard positions causing said brake means to relieve said forces, said movement of the operating lever to said inboard position being for use in holding the arms in said closed position or in any of said open positions.

* * * * *